(12) United States Patent
Peppler

(10) Patent No.: US 6,279,676 B1
(45) Date of Patent: Aug. 28, 2001

(54) VEHICLE STEERING GEAR MOUNTED IN SUSPENSION PART

(75) Inventor: Steven A. Peppler, West Lafayette, IN (US)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 09/421,588

(22) Filed: Oct. 20, 1999

(51) Int. Cl.⁷ .................................. B62D 5/06; B62D 7/18
(52) U.S. Cl. .............. 180/428; 280/93.513; 280/93.512; 280/124.125
(58) Field of Search .................... 180/417, 431, 180/441, 426, 427, 428, 438, 432; 280/124.125, 93.513, 93.51, 93.512

(56) References Cited

U.S. PATENT DOCUMENTS

| | | | |
|---|---|---|---|
| 4,693,487 | * 9/1987 | Cooper | 280/86.758 |
| 4,972,914 | 11/1990 | Asanuma . | |
| 5,044,456 | * 9/1991 | Hayashi et al. | 180/417 |
| 5,086,864 | * 2/1992 | Elser | 180/417 |
| 5,129,474 | * 7/1992 | Rauter et al. | 180/417 |
| 5,562,017 | 10/1996 | Wuenscher . | |
| 5,803,201 | * 9/1998 | Sheppard | 180/417 |
| 6,135,232 | * 10/2000 | Salg | 180/432 |
| 6,206,132 | 3/2001 | Urbach | 180/402 |

FOREIGN PATENT DOCUMENTS

8200983 * 4/1982 (EP) .

* cited by examiner

Primary Examiner—Lanna Mai
Assistant Examiner—Ruth Ilan
(74) Attorney, Agent, or Firm—Tarolli, Sundheim, Covell, Tummino & Szabo L.L.P.

(57) ABSTRACT

A steering apparatus (10) for use in a vehicle (12) having a steerable road wheel (14) includes a steering member (30) supporting the road wheel for rotation relative to the steering member. A vehicle suspension part (22) supports the steering member (30) for pivotal movement about a steering axis (42). The vehicle suspension part (22) has a housing portion (26) defining a chamber (50). A piston (52) is located in the chamber (50) and divides the chamber into first and second chamber portions (56, 58). The piston (52) is movable in response to changes in fluid pressure in the chamber portions (56, 58). An output shaft (90) is rotatable in opposite directions in response to movement of the piston (52) in opposite directions. The output shaft (90) is connected to the steering member (30) to pivot the steering member about the steering axis (42) upon rotation of the output shaft.

10 Claims, 3 Drawing Sheets

VEHICLE STEERING GEAR MOUNTED IN SUSPENSION PART

BACKGROUND OF THE INVENTION

1. Technical Field

The present invention relates to a steering apparatus for a vehicle. In particular, the present invention relates to a vehicle steering apparatus including a fluid power assist steering gear for effecting steering movement of a steerable road wheel of a vehicle.

2. Description of the Prior Art

A motor vehicle includes a steering system for steering the steerable road wheels, typically the front wheels, of the vehicle. The steering system often includes a steering gear assembly located remote from the steerable wheels of the vehicle, for example, on the vehicle frame or body.

U.S. Pat. No. 5,562,017 discloses a fluid power assist vehicle steering system that includes an integral power steering gear. The integral power steering gear is located remote from the steerable wheels of the vehicle. Actuation of the steering gear rotates a sector shaft or output shaft that is connected with a pitman arm. The pitman arm is connected through linkage, such as tie rods, to the steerable wheels of the vehicle.

U.S. Pat. No. 4,972,914 discloses a vehicle steering system located adjacent to a steerable wheel of the vehicle. The steering system includes an electric motor mounted with a McPherson strut. Actuation of the motor rotates the piston of the strut to steer the steerable wheel of the vehicle.

SUMMARY OF THE INVENTION

The present invention is a steering apparatus for use in a vehicle having a steerable road wheel. The steering apparatus comprises a steering member supporting the road wheel for rotation relative to the steering member, and a vehicle suspension part supporting the steering member for pivotal movement about a steering axis. The vehicle suspension part has a housing portion defining a chamber. A piston is located in the chamber and divides the chamber into first and second chamber portions. The piston is movable in response to changes in fluid pressure in the chamber portions. An output shaft is rotatable in opposite directions in response to movement of the piston in opposite directions. The output shaft is connected to the steering member to pivot the steering member about the steering axis upon rotation of the output shaft.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
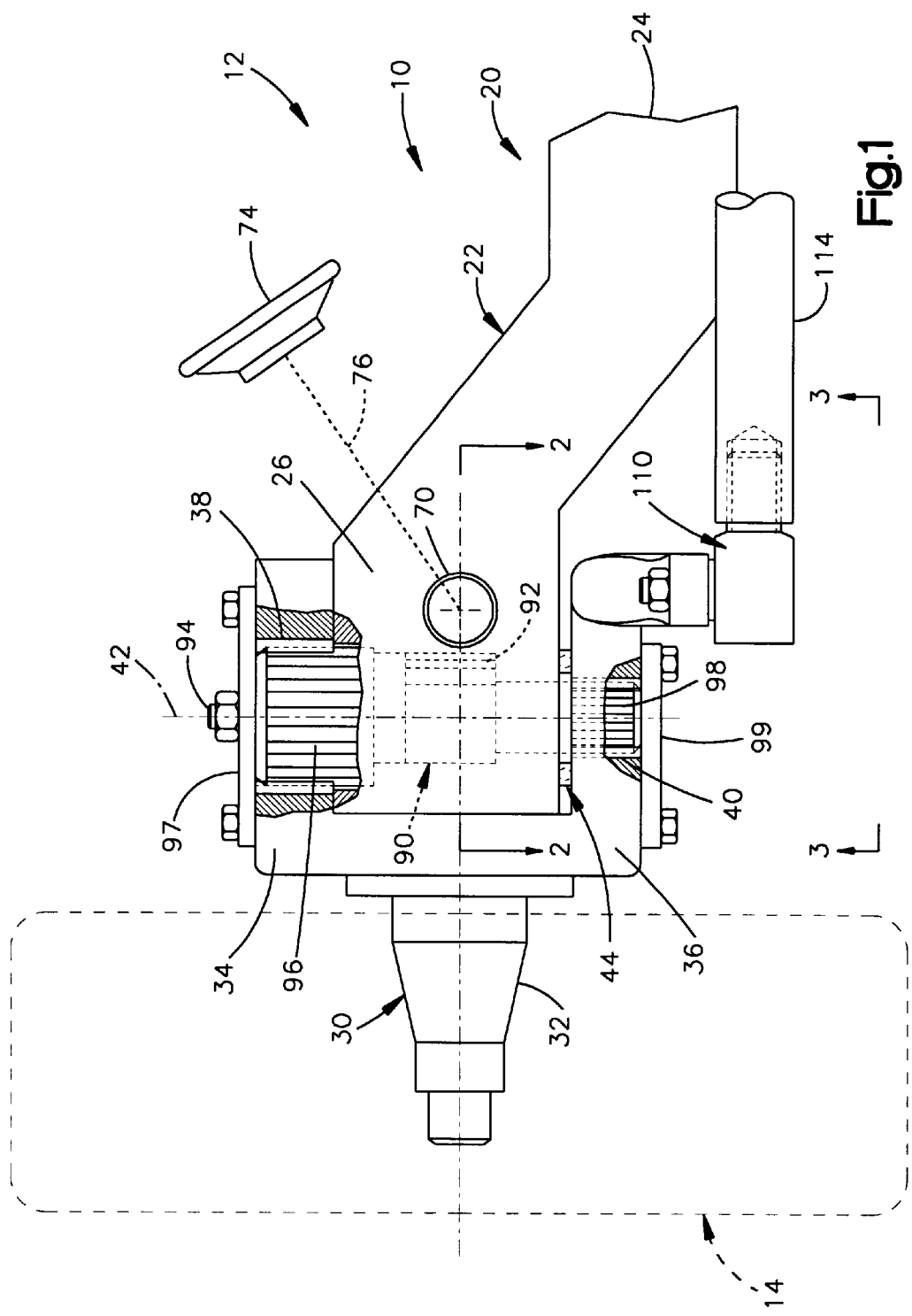
FIG. 1 is a schematic illustration of a portion of a vehicle including a steering apparatus constructed in accordance with the present invention, in a direction looking forward in the vehicle from behind the steering apparatus.

The present invention relates to a steering apparatus for a vehicle. In particular, the present invention relates to a vehicle steering apparatus including a fluid power assist steering gear for effecting steering movement of a steerable road wheel of a vehicle. The present invention is applicable to various steering apparatus constructions. As representative of the invention, FIG. 1 illustrates a steering apparatus 10 for a vehicle 12.

The vehicle 12 has a steerable road wheel 14. The steerable road wheel 14 may be either a front wheel of the vehicle 12 or a rear wheel of the vehicle. In the illustrated embodiment, the steerable road wheel 14 is a left front wheel of the vehicle 12.

The road wheel 14 is connected with the vehicle body or frame (not shown) by a vehicle suspension 20. The suspension 20 includes the parts of the vehicle 12 that connect the road wheel 14 to the vehicle body or frame. The suspension 20 may include, for example, one or more springs and one or more shock absorbers of the vehicle.

In the illustrated embodiment of the invention, the suspension 20 includes a left front I-beam or axle 22. The axle 22 has an inner portion 24 connected with the other parts of the vehicle, and an outer end portion or housing portion 26 configured in accordance with the present invention.

The suspension 20 also includes a steering knuckle 30. The steering knuckle 30 has an outer end portion 32 that supports the road wheel 14 for rotation. The steering knuckle 30 has spaced upper and lower arms 34 and 36 that extend inward from the outer end portion 32. The upper arm 34 has a relatively large diameter splined opening 38. The lower arm 36 has a relatively small diameter splined opening 40. The openings 38 and 40 are centered on a steering axis 42. The housing portion 26 of the axle 20 is disposed between the upper and lower arms 34 and 36 of the steering knuckle 30. A thrust bearing 44 is disposed between the housing portion 26 and the lower arm 36 of the steering knuckle 30.

Figure 2:
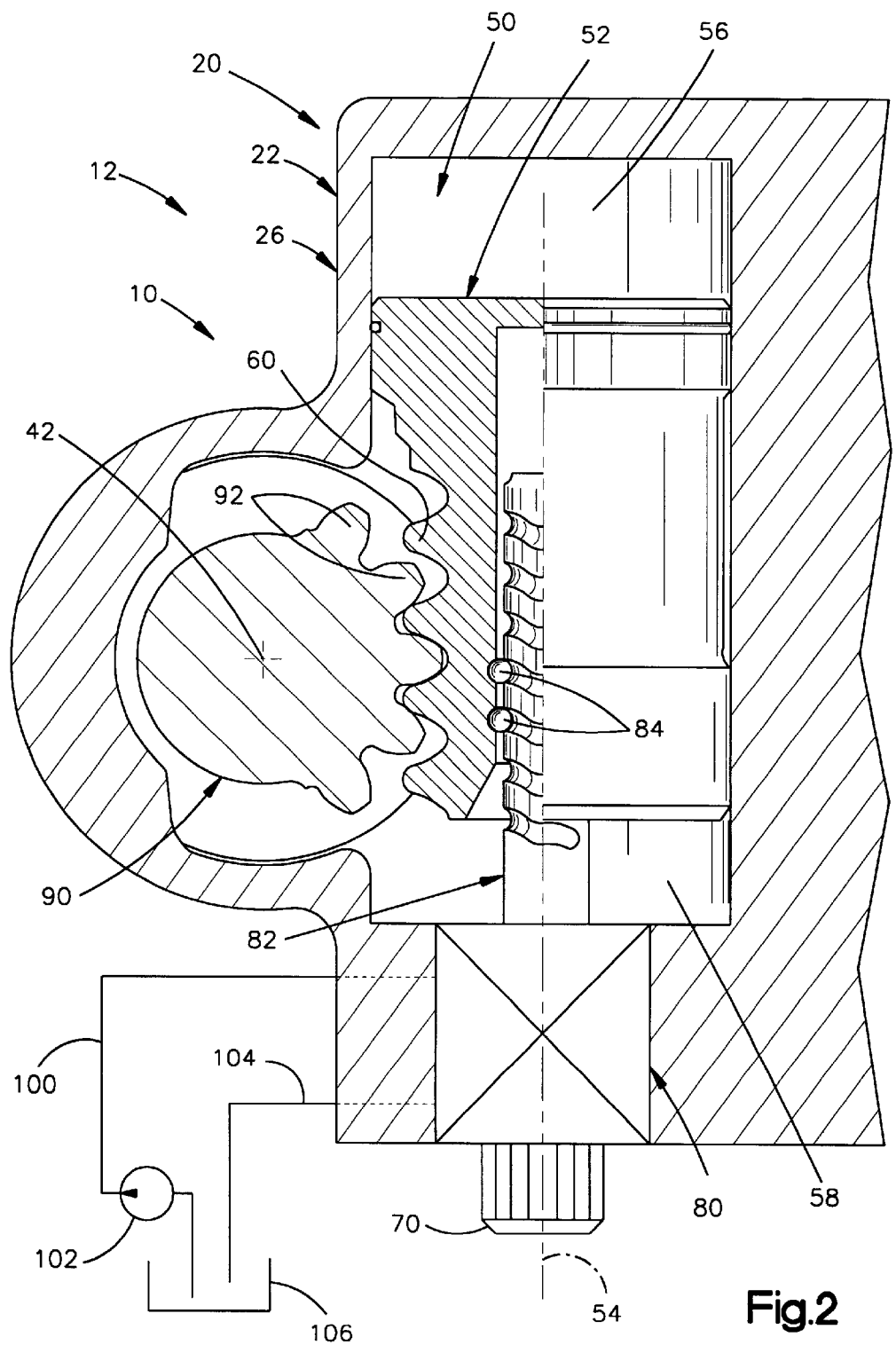
FIG. 2 is a schematic illustration, partially in section, of the steering apparatus of FIG. 1, taken in a direction looking down and generally along line 2—2 of FIG. 1.
Figure 3:
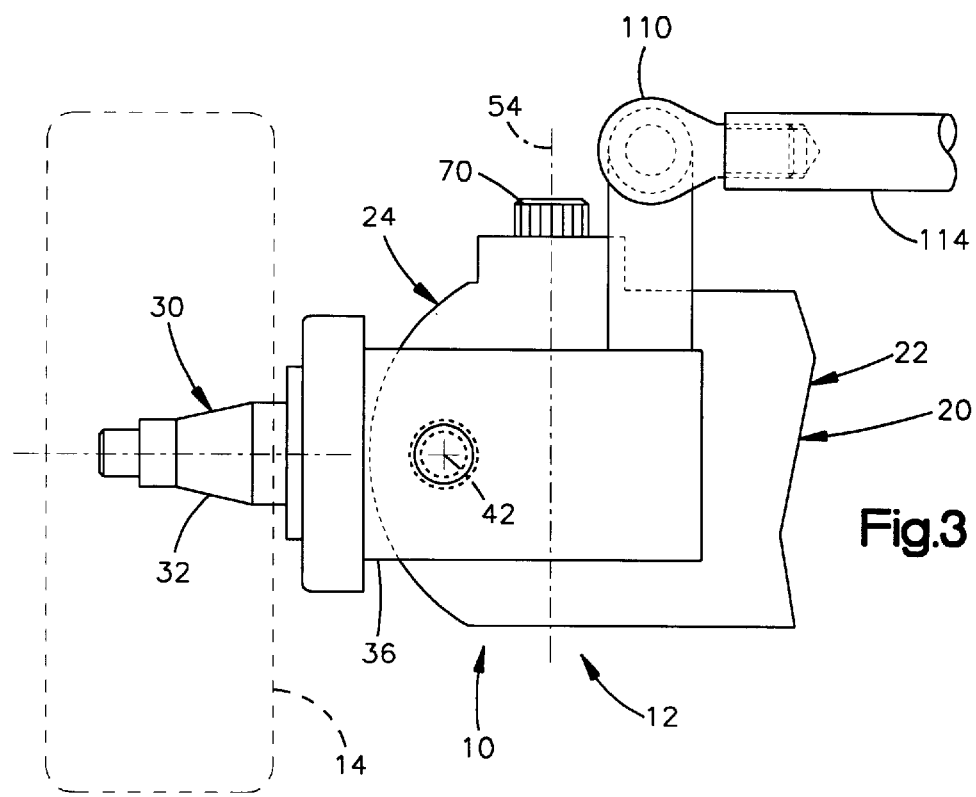
FIG. 3 is a view of the steering apparatus of FIG. 1, in a direction looking upward from below the steering apparatus.

The housing portion 26 of the axle 22 is machined to define a chamber 50 (FIG. 2) in the axle 22. A piston 52 is supported in the chamber 50 for sliding movement in opposite directions (upward and downward as viewed in FIG. 2) along an input axis 54. The piston 52 divides the chamber 50 into a first chamber portion 56 and a second chamber portion 58. A plurality of external gear teeth 60 are formed on the piston 52.

A steering input shaft 70 extends into the housing portion 26 of the axle 22. The input shaft 70 is supported for rotation about the input axis 54. The input shaft 70 is rotatable by a vehicle steering wheel 74 (FIG. 1) through a connection such as known steering column linkage indicated schematically at 76. The input shaft 70 may be actuated in any of several other manners, such as mechanically, electrically or hydraulically.

The input shaft 70 is connected, through a directional control valve 80, to a screw shaft 82. The screw shaft 82 is rotatable about the input axis 54. The screw shaft 82 is connected through balls 84 to the piston 52. Axial movement of the piston 52, in response to changes in fluid pressure in the chamber portions 56 and 58, results in rotation of the screw shaft 82, in a known manner. In the event of loss of fluid pressure, turning of the vehicle steering wheel causes rotation of the screw shaft 82 and results in axial movement of the piston 52.

A sector shaft 90 is disposed in the housing portion 26 of the axle 22. The sector shaft 90 is rotatable relative to the housing portion 26, about the steering axis 42. The sector shaft 90 has a plurality of sector gear teeth 92. The sector gear teeth 92 on the sector shaft 90 are in meshing engagement with the gear teeth 60 on the piston 52. An adjusting screw 94 (FIG. 1) is rotatable to control the preload on the sector shaft 90.

The sector shaft 90 is fixed for rotation with the steering knuckle 30 about the steering axis 42. A splined upper end portion 96 of the sector shaft 90 projects from the housing portion 26 of the axle 22. The upper end portion 96 of the sector shaft 90 is received in the large diameter splined opening 38 in the upper arm 34 of the steering knuckle 30. A cap 97 seals against the upper arm 34 of the steering knuckle 30.

A splined lower end portion 98 of the sector shaft 90 projects from the housing portion 26 of the axle 22. The lower end portion 98 of the sector shaft 90 is received in the small diameter splined opening 40 in the lower arm 36 of the steering knuckle 30. A cap 99 seals against the lower arm 36 of the steering knuckle 30.

The chamber 50 (FIG. 2) is connected by a fluid inlet 100 with a pump 102. The chamber is connected by a fluid outlet 104 with a reservoir or tank 106.

When it is desired to change the direction of travel of the vehicle, rotation of the vehicle steering wheel 74 results in rotation of the input shaft 70. The directional control valve 80 causes fluid under pressure to be directed into one or the other of the chamber portions 56 and 58, while fluid is exhausted from the other chamber portion, in a known manner. The piston 52 moves in a first direction along the input axis 54, in the housing portion 26 of the axle 22. Fluid is recirculated through the chamber 50, between the chamber portions 56 and 58, through conduits (not shown) in a known manner.

Axial movement of the piston 52 in the first direction causes rotation of the sector shaft 90 because of the meshing engagement of the gear teeth 60 on the piston 52 with the sector gear teeth 92 on the sector shaft 90. Rotation of the sector shaft 90 about the steering axis 42 is transmitted through the splined end portions 96 and 98 of the sector shaft 90 into the steering knuckle 30.

The steering knuckle 30 pivots in a first direction about the steering axis 42, effecting steering movement of the road wheel 14. The pivoting movement of the steering knuckle 30 is transmitted through a ball joint 110 and a tie rod 114 to the steerable road wheel (not shown) on the opposite side of the vehicle 12.

Rotation of the vehicle steering wheel 74 in a second, opposite, direction results in movement of the piston 52 in a second, opposite, direction in the housing portion 26 of the axle 22. This opposite movement of the piston 52 causes the sector shaft 90 to rotate in the opposite direction, effecting steering movement of the road wheel 14 in an opposite, second direction.

Figure 4:
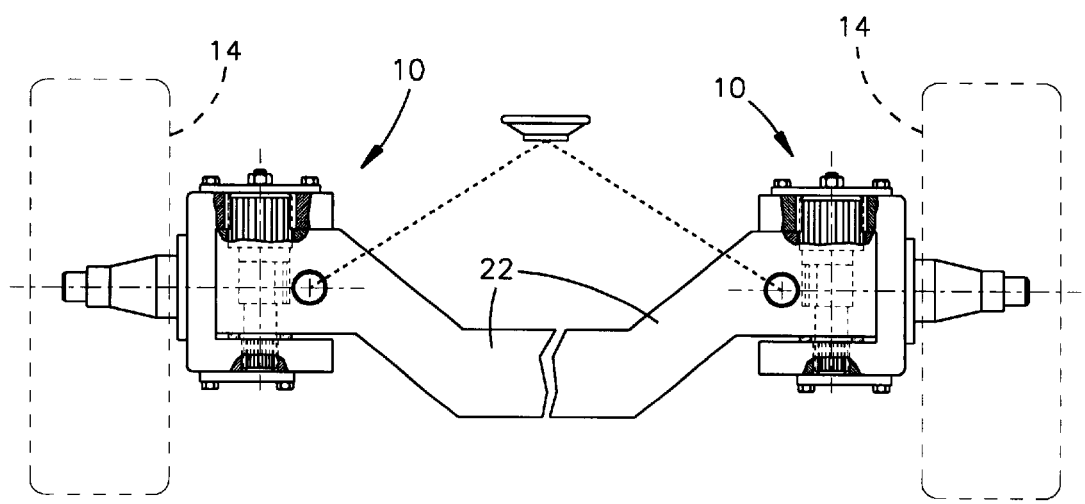
FIG. 4 is an illustration similar to FIG. 1 of a vehicle having two steering apparatuses in accordance with the present invention for steering both front wheels of a vehicle.

From the above description of the invention, those skilled in the art will perceive improvements, changes and modifications in the invention. For example, a separate steering apparatus 10 can be provided for each steerable road wheel of a vehicle, as shown in FIG. 4. The steering apparatus can include a steering gear mounted in a different vehicle suspension part than the end of an axle. The steering gear can be enclosed in a separate housing mounted in the vehicle suspension part. The steering gear power could be electrical (a motor having an output shaft splined to the steering knuckle), or manual (i.e., fluid power assisted). Such improvements, changes and modifications within the skill of the art are intended to be covered by the appended claims.

Having described the invention, I claim:

1. A steering apparatus for use in a vehicle having a steerable road wheel, said steering apparatus comprising:

a steering member supporting the road wheel for rotation relative to the steering member;

a vehicle suspension part supporting the steering member for pivotal movement about a steering axis, said vehicle suspension part having a housing portion defining a chamber;

a piston in said chamber and dividing said chamber into first and second chamber portions, said piston being movable in response to changes in fluid pressure in said chamber portions;

an output shaft rotatable in opposite directions in response to movement of said piston in opposite directions;

said output shaft being connected to said steering member to pivot said steering member about said steering axis upon rotation of said output shaft;

wherein said steering member is a steering knuckle having upper and lower arms, said output shaft being fixed for rotation with said steering knuckle about said steering axis, said output shaft having a first end portion connected with said upper arm of said steering knuckle, said output shaft having a second end portion connected with said lower arm of said steering knuckle.

2. An apparatus as set forth in claim 1 wherein said vehicle suspension part is an axle and said housing portion is formed on an outer end portion of said axle.

3. An apparatus as set forth in claim 1 wherein said output shaft is a sector shaft having a plurality of sector gear teeth, said piston having a plurality of gear teeth in meshing engagement with said sector gear teeth.

4. A steering apparatus for use in a vehicle having a steerable road wheel, said steering apparatus comprising:

a steering member supporting the road wheel for rotation relative to the steering member;

a vehicle suspension part supporting the steering member for pivotal movement about a steering axis, said vehicle suspension part having a housing portion defining a chamber;

a piston in said chamber and dividing said chamber into first and second chamber portions, said piston being movable in response to changes in fluid pressure in said chamber portions;

an output shaft rotatable in opposite directions in response to movement of said piston in opposite directions;

said output shaft being connected to said steering member to pivot said steering member about said steering axis upon rotation of said output shaft;

said output shaft having first and second opposite end portions both connected to said steering member.

5. A steering apparatus for use in a vehicle having a steerable road wheel, said steering apparatus comprising:

a steering member supporting the road wheel for rotation relative to the steering member;

a vehicle suspension part supporting the steering member for pivotal movement about a steering axis, said vehicle suspension part having a housing portion defining a chamber;

a piston in said chamber and dividing said chamber into first and second chamber portions, said piston being movable in response to changes in fluid pressure in said chamber portions;

an output shaft rotatable in opposite directions in response to movement of said piston in opposite directions;

said output shaft being connected to said steering member to pivot said steering member about said steering axis upon rotation of said output shaft;

wherein said piston is supported in said chamber for sliding movement relative to said housing portion, said piston having a plurality of gear teeth, said output shaft having a plurality of gear teeth in meshing engagement with said gear teeth on said piston, said apparatus further including a screw shaft driven for rotation in response to axial sliding movement of said piston, a steering input shaft and a control valve connected between said input shaft and said screw shaft, said screw shaft and said control valve being mounted in said chamber in said housing portion of said vehicle suspension part.

6. An apparatus as set forth in claim 5 wherein said steering member is a steering knuckle.

7. An apparatus as set forth in claim 6 wherein said vehicle suspension part is an axle and said housing portion is formed on an outer end portion of said axle.

8. An apparatus as set forth in claim 6 wherein said output shaft has first and second opposite end portions both connected to said steering member.

9. An apparatus as set forth in claim 8 wherein said output shaft is connected to said steering member by at least one splined connection.

10. A steering apparatus for use in a vehicle having a steerable road wheel, said steering apparatus comprising:

a steering member supporting the road wheel for rotation relative to the steering member;

a vehicle suspension part supporting the steering member for pivotal movement about a steering axis, said vehicle suspension part having a housing portion defining a chamber;

a piston in said chamber and dividing said chamber into first and second chamber portions, said piston being movable in response to changes in fluid pressure in said chamber portions;

an output shaft rotatable in opposite directions in response to movement of said piston in opposite directions;

said output shaft being connected to said steering member to pivot said steering member about said steering axis upon rotation of said output shaft;

said apparatus further including a steering input shaft rotatable by a steering wheel of the vehicle and a control valve connected with said input shaft, said control valve being mounted in said chamber in said housing portion of said vehicle suspension part.

* * * * *